United States Patent [19]

Riker, deceased

[11] Patent Number: 5,405,555
[45] Date of Patent: Apr. 11, 1995

[54] FIRE RETARDANT AND METHOD FOR PREPARATION

[75] Inventor: Elwood N. Riker, deceased, late of Laguna Hills, Calif., by Elizabeth A. Riker, executor

[73] Assignee: American Uni-Tech, Inc., Irvine, Calif.

[21] Appl. No.: 214,748

[22] Filed: Mar. 18, 1994

[51] Int. Cl.$^6$ .................. C09K 21/02; C09K 21/06
[52] U.S. Cl. .................. 252/607; 252/608; 252/609
[58] Field of Search .................. 252/607, 608

[56] References Cited

U.S. PATENT DOCUMENTS

| | | | |
|---|---|---|---|
| 641,801 | 1/1900 | Schroeter | 252/607 |
| 1,738,976 | 3/1927 | Vivas | 252/607 |
| 3,378,381 | 4/1968 | Draganov | 106/15 |
| 3,438,847 | 4/1969 | Chase | 161/166 |
| 4,072,473 | 2/1978 | Radkowski et al. | 44/46 |
| 4,184,969 | 1/1980 | Bhat | 252/8.1 |
| 4,224,169 | 9/1980 | Retana | 252/8.1 |
| 4,461,721 | 7/1984 | Goettsche et al. | 252/607 |
| 4,514,327 | 4/1985 | Rock | 252/607 |
| 4,620,892 | 1/1986 | Dodson et al. | 156/319 |
| 4,839,065 | 6/1989 | Vandersall | 252/603 |

*Primary Examiner*—Robert L. Stoll
*Assistant Examiner*—Joseph D. Anthony
*Attorney, Agent, or Firm*—Plante, Strauss

[57] ABSTRACT

The invention relates to an aqueous fire retardant solution, a method of making said solution, and a method of using said solution as a coating for cellulosic materials and cellulosic containing materials. The fire retarding solution consists essentially of: ammonium sulfate 3-10% by weight, boric acid 1-5% by weight, borax 0.3-1% by weight, hydrogen peroxide 1-5% by weight, and optionally a surfactant and/or an alkyl phthalate ester.

20 Claims, No Drawings

FIRE RETARDANT AND METHOD FOR PREPARATION

BACKGROUND OF THE INVENTION

1. Field Of The Invention

This invention relates to a fire retardant, and in particular to a fire retardant useful as a coating for cellulosic materials and for admixture with hydrocarbons.

2. Brief Statement Of The Prior Art

Oxygenated boron compounds such as borax (sodium tetraborate decahydrate) and boric acid are known to impart fire retardancy to cellulosic materials, particularly when admixed with other agents. U.S. Pat. No. 641,801 discloses that a mixture of borax, magnesium sulfate, gypsum and ammonium chloride is a fire retardant for fabric when used at concentrations of about 10 weight percent.

U.S. Pat. No. 3,378,381 discloses that wood can be made fire retardant by impregnation at elevated temperatures and pressures with a mixture of borax, boric acid and lignin sulfate and wax at concentrations of about 10 weight percent.

U.S. Pat. No. 3,438,847 discloses that a fire retardant composite board can be prepared by soaking wood chips in a solution of disodium metaborate, drying the chips and then treating the dried chips with boric acid and a resin and wax mixture. The metaborate and boric acid are used at concentrations of 20-29 weight percent of the wood chips.

U.S. Pat. No. 4,184,969 discloses cellulose fiber insulation which is impregnated with 12 to 18 weight percent of a mixture of alumina trihydrate, ammonium sulfate, borax, boric acid and nepheline syenite (a sodium potassium alumina silicate).

U.S. Pat. No. 4,224,169 discloses that a mixture of ammonium bromide and iodide, ammonium orthophosphate, borax, boric acid, ammonium sulfate and sodium silicate can be used as a fire retardant coating.

U.S. Pat. No. 4,461,721 discloses that a mixture of boric acid and an alkanol amine such as monoethanol amine can be used to impregnate wood and impart fire retardancy. The amine is used to facilitate the penetration of the wood by boric acid.

The prior art which has thus used oxygenated boron compounds as fire retardants at relatively high dosages, typically about 10 weight percent or greater, on cellulosic materials such as wood and cellulosic fabrics. Additionally, the prior art has admixed other fire retardants such as ammonium halides and inorganic oxides such as alumina and alumina silicates with boron compounds to achieve desired fire retardancy. This approach is not entirely satisfactory because it imparts toxicity to the retardant and treated substrate and because the decomposition products from exposure to a flame are toxic, e.g., hydrogen iodide and iodates or bromide or bromates. Further, the inorganic oxides increase the solids loading of the treating solution, impairing the clarity of coatings and inhibiting the penetration of the retardants into the substrate.

OBJECTIVES OF THE INVENTION

It is an objective of this invention to provide a fire retardant utilizing oxygenated boron compounds.

It is a further objective of this invention to provide a fire retardant which can be applied as a coating or impregnant to cellulosic materials.

It is a still further objective of this invention to provide a fire retardant which can be admixed with combustible organic liquids such as hydrocarbons and petrochemicals to impart fire retardancy thereto.

It is likewise an objective of this invention to provide a fire retardant which will form clear coatings.

It is an additional objective of this invention to provide a fire retardant which can be used at low concentrations.

It is also an objective of this invention to provide a fire retardant which will not generate volatile toxic materials when exposed to a flame.

It is another objective of this invention to provide a fire retardant which is not toxic.

Other and related objectives will be apparent from the following description of the invention.

BRIEF STATEMENT OF THE INVENTION

This invention comprises a fire retardant which is an aqueous solution of the following active fire retardants: ammonium sulfate, boric acid, borax, hydrogen peroxide. Other optional additives include a surfactant which is used in an amount from 0.5 to 3 weight parts, and an aliphatic diester such as dibutyl phthalate which is used in an amount from 0.3 to 2 weight parts per 100 parts of the aqueous solution. The optional additives enhance the coating and penetration capability of the composition.

DESCRIPTION OF PREFERRED EMBODIMENT

The fire retardant of this invention is an aqueous solution of the active ingredients which are used at the following concentrations in weight percents:

| Ingredient | Broad Range | Preferred | Most Preferred |
| --- | --- | --- | --- |
| Ammonium sulfate | 3–10% | 4–7% | 5.7% |
| Boric acid | 1–5 | 1.5–4 | 2.8 |
| Borax | 0.3–1 | 0.5–0.8 | 0.7 |
| Hydrogen Peroxide | 1–5 | 2–5 | 3 |

Other optional additives can be used with the retardant solution to enhance its wetting properties, its film forming properties, and the clarity of its coatings. These include a surfactant in an amount from about 0.5 to 3 weight parts per 100 parts of the aqueous solution. Also included is an aliphatic diester in an amount from 0.3 to about 2 weight parts per 100 parts of the aqueous solution.

Suitable surface active agents can be of the cationic, anionic or nonionic type.

Examples of the cationic surfactants include: fatty amines; alkarylamines; quaternary alkyl and aryl ammonium salts and hydrates; quaternary ammonium bases of fatty amides of disubstituted diamines; fatty derivatives of benzimidazolines; etc.

Examples of useful anionic surface active agents include the following: fatty acid glyceride sulfonates and fatty acid sulfonates; amides of amino-sulfonic acids; oleylmethyl tauride; amides from condensation of fatty acid chlorides with amino acids; sulfonated aromatic hydrocarbons; etc.

Illustrative nonionic compounds include the polyethylene oxide condensates with hydrophobic groups having a reactive hydrogen. The hydrophobic group can have from about 10 to 25 carbon atoms and from 2 to about 15 molecular weights of ethylene oxide are commonly condensed per molecular weights of hydrophobic group. The hydrophobic group can be selected from a variety of organic compounds having one or more reactive hydrogens including fatty alkyl or alkenyl alcohols, fatty acids, fatty amide, esterified hexitans or alkyl or alkenyl phenols.

The aliphatic diester serves as a masking agent to enhance the clarity and resiliency of the coating. Suitable aliphatic diesters are the esters of alkanols and isoalkanols having from 1 to about 8 carbons with dicarboxylic acids having from 4 to about 10 carbons in an aliphatic or aromatic group such as dibutyl, di(2-ethylhexyl), diethyl, diisopropyl phthalate, terephtalate, isophthalate, diisobutyrate, etc. Of the foregoing, dibutyl phthalate is preferred.

The fire retardant solution is prepared with care to achieve complete solubility of the ingredients. This can be accomplished by adding the dry solutes to water, agitating and heating until dissolved, and then adding the liquid ingredients and additives. Preferably, a portion of the dry solutes are dissolved in only a portion of the water of the final solution, e.g., from about 25 to 50, preferably 33 percent of the water is used to dissolved the dry solutes. This portion is heated to a temperature of 125° to 140° F. and the dry solutes consisting of ammonium sulfate, borax and boric acid are added and the mixture is stirred until the solids are completely dissolved. Thereafter, the balance of the water is added, and hydrogen peroxide and the surfactant and aliphatic diester are added to obtain a clear aqueous solution.

The fire retardant solution contains from 7 to 15, preferably 10 to 11 weight percent solids with a neutral pH from about 6.8 to 7.2, preferably about 7. It has viscosity from about 17 to 24 cps, preferably about 20 cps measured at 30 rpm at 25° C.

The fire retardant is used by application to the surfaces of solid combustible substrates by any suitable method including dipping the substrate in the fire retardant solution, and brushing, or spraying the fire retardant solution onto the surface of the substrate. When the fire retardant is to be used with combustible liquids, it can simply be admixed with the liquid to form an intimate mixture.

Suitable combustible substrates which can be treated to resist combustion include cellulosic materials such as wood, paper, cotton, jute, linen, rayon, etc. When treating fibrous products the fire retardant solution can be applied to the fibers prior to spinning or weaving, or can be applied to the finished fabric. Since the fire retardant solution dries to a clear coating and since it is effective at relatively low concentrations, the treatment with the fire retardant solution does not stain or discolor the substrate or dull its appearance.

The amount of the fire retardant solution which is applied to the combustible substrate can be expressed as a function of the surface area of most substrates, as its retardancy is effective on the surface of the substrate. Useful amounts of the fire retardant solution are from 0.3 to about 3 gallons per 100 square feet of substrate surface area, preferably from 0.5 to 1 gallon per 100 square feet.

The following examples will serve to illustrate the application of the invention and demonstrate the results which are obtained:

EXAMPLE 1

A fire retardant solution is prepared by heating 35 gallons of water to 135° F. in an open top vessel equipment with a propeller mixer. After reaching the temperature, 50 pounds of ammonium sulfate, 25 pounds of boric acid and 6.25 pounds of borax are added and the mixture is stirred until the solids are totally dissolved; approximately for 15 minutes.

Thereafter 56 gallons of water are added and 3.125 gallons of a 3 weight percent hydrogen peroxide solution is added. One gallon of surface active agent and one gallon of dibutylphthalate are added and the resultant mixture is stirred to completely disperse the added liquids. The resultant fire retardant solution has a density of 8.8 pounds per gallon, a pH of 6.9, viscosity of 20 cps and a solids content of 10.2 weight percent. It is clear, transparent liquid.

EXAMPLE 2

The fire retardancy of the fire retardant solution is evaluated on Douglas fir test specimens using a standard test described in "Test for Surface Burning Characteristics of Building Materials" UL 723, Sixth Edition., which determines the flame spread and smoke developed. In the test, nine test decks were prepared using nominal 1×4 inch boards laid side by side and fastened together on the unexposed surface by Douglas fir furring strips. Each test deck measured 22 inches by 96 inches.

The fire retardant solution is applied to the surface of test specimens of Douglas fir at a dosage of 0.5 gallons per 100 square feet by airless spraying. The applied solution is permitted to dry for 25 days at 70° F. and 50% relative humidity. The coatings are clear and transparent.

Three of the test decks are placed end to end, across a tunnel with their opposite longitudinal edges resting on the tunnel sides, forming a deck 24 feet long. A steel plate was placed upstream of the burners to complete the deck across a 25 foot tunnel.

Gas burners were ignited and the rate of flame spread was determined by measuring the progression of the flame front on the treated wood specimens. The flame spread index for the wood specimens is determined following the procedure of the standardized test. The index determined for each of the test specimens is reported in the following table:

TABLE 1

| Material | Maximum Flame Spread Ft. | Time of Maximum Flame Spread, Min:Sec | Calculated Total Area Under the Time Distance Curve Min-Ft | Calculated Value For Flame Spread |
| --- | --- | --- | --- | --- |
| Uncoated Douglas fir | 18 | 9:08 | 128.03 | 73.2 |
| Fire Retardant Coated Douglas fir | 9½ | 8:36 | 71.57 | 36.9 |
| Fire Retardant Coated Douglas fir | 9 | 8:43 | 67.42 | 34.7 |
| Fire Retardant Coated Douglas fir | 10 | 9:31 | 66.19 | 34.1 |

The test results are also evaluated for flame spread index with the procedure of the National Standard of Canada CAN/ULC-S102-M88 "Standard Method of Test for Surface Burning Characteristics of Building Material and Assemblies". The following table sets out the results:

TABLE 2

| Material | Maximum Flame Spread, m | Time of Maximum Flame Spread Min.Sec | Calculated Total Area Under the Time Distance Curve, Min-m | Calculated Value For Flame Spread |
| --- | --- | --- | --- | --- |
| Uncoated Douglas fir | 5.48 | 9:08 | 39.02 | 80.5 |
| Coated Douglas fir | 2.90 | 8:36 | 21.81 | 40.4 |
| Coated Douglas fir | 2.74 | 8.43 | 20.55 | 38.0 |
| Coated Douglas fir | 3.05 | 9.31 | 20.17 | 37.3 |

The smoke developed is monitored during the burning test with a photoelectric circuit across the flue of the test furnace. The values of light obstruction which are measured are plotted against time to obtain a smooth curve, and the area under the curve is determined. The Smoke Developed Index for the test sample is determined by dividing the area under the curve by the corresponding area under the curve which is developed when untreated red oak is subjected to the flame test. The following results are obtained:

TABLE 3

| Material | Calculated Value for Smoke Developed |
| --- | --- |
| Uncoated Douglas fir | 66.5 |
| Fire Retardant Coating Douglas fir | 54.5 |
| Fire Retardant Coating Douglas fir | 59.5 |
| Fire Retardant Coating Douglas fir | 61.3 |

EXAMPLE 3

The fire retardant solution is tested on fabrics using the procedures and regulations outlined in the California Administrative Code, Title 19, Subchapter 8, Article 4, Section 1237.1 and Technical Bulletin 801 (Oct. 27, 1984) "Small Scale Vertical Test". Briefly, the test fabrics are suspended vertically and exposed to flame for a prescribed period of time; the flame is removed, and the time of afterflame, afterglow and the length of char of the samples is recorded. The requirements for meeting approval of the test are that the afterflame not last longer than 2 seconds, and that not more than 6 inches of the fabric be charred.

The fire retardant was applied by spraying onto the following: 100% polyester wrap; 100% polyester fill; 100% cotton wrap; 100% cotton fill; 50/50 blend of cotton and polyester wrap and fill. The results which were obtained are set out in the following table:

TABLE 4

| Sample | Afterflame Seconds | Afterglow Seconds | Char Length Inches | Drippings, Afterflame Seconds |
| --- | --- | --- | --- | --- |
| Polyester Warp | 1.8 | None | 4.0 | None |
|  | 0.0 | None | 4.3 | None |
|  | 0.0 | None | 4.7 | None |
|  |  | Avg. | 4.3 |  |
| Polyester Fill | 1.6 | None | 3.3 | None |
|  | 0.0 | None | 3.5 | None |
|  | 0.0 | None | 3.8 | None |
|  |  | Avg. | 3.5 |  |
| 50/50 Blend Wrap | 0.0 | None | 3.3 | None |
|  | 0.0 | None | 3.2 | None |
|  | 0.0 | None | 3.6 | None |
|  |  | Avg. | 3.4 |  |
| Fill | 0.0 | None | 4.2 | None |
|  | 0.0 | None | 4.1 | None |
|  | 0.0 | None | 3.1 | None |
|  |  | Avg. | 3.8 |  |
| Cotton Wrap | 0.0 | None | 4.1 | None |
|  | 0.0 | None | 3.3 | None |
|  | 0.0 | None | 3.3 | None |
|  |  | Avg. | 3.6 |  |
| Fill | 0.0 | None | 4.0 | None |
|  | 0.0 | None | 3.6 | None |
|  | 0.0 | None | 3.7 | None |
|  |  | Avg. | 3.8 |  |

The results on flame retardancy meet the flammability requirements of the California State Fire Marshall. All the treated samples retained the original appearance and feel of untreated fabric and the fire retardant coating was not visible on the fabrics.

When the test is repeated using a fire retardant solution which included all the ingredients, except hydrogen peroxide, the flame retardant solution was not as effective and several additional applications to the fabric were required to obtain any measurable flame retardancy.

EXAMPLE 4

The fire retardant solution was tested for effectiveness on cloth and paper using the oxygen index method (ASTM D-2863), the MVSS-302 horizontal test, and the DOC FF3-71 vertical flammability test. Cloth, cotton mattress ticking, and 0.002 inch thick kraft paper were tested. The fire retardant solution was applied to the test materials with a hand sprayer with several applications to obtain even coating. The samples were permitted to dry for 24 hours before testing.

The treatment raised that oxygen index of all specimens, including polyester and cotton and polyester blends which are usually difficult to flame retard. The oxygen index of the cotton ticking and paper increased with treatment level and oxygen indexes over 30 were obtained.

The treated cotton samples passed the MVSS-302 test and thus met the requirements for use in automotive interiors. The treated kraft paper exhibited a burn rate of less than 4 inches per minute at a treatment level of 3 weight percent, and thus also met the requirements for use in automotive interiors.

In the DOC FF3-71 test, acceptable fire retarded materials must have a char length not greater than 7 inches. The cotton ticking at a treatment level of 8.5% exhibited a char length of 7.8 inches which was reduced to 3.7 inches at a treatment level of 13.9%. A char length of 4.2 inches was obtained for the kraft paper at a treatment dosage of 8.5%.

The preceding examples are presented solely to illustrate the preparation and use of the fire retardant solution of the invention. It is not intended that the examples and description of the preferred embodiment be unduly limiting of the invention. Instead, it is intended that the invention be defined by the ingredients and steps, and their obvious equivalents, set forth in the following claims.

What is claimed is:

1. A fire retardant solution consisting essentially of:
   a. from 3 to about 10 weight percent ammonium sulfate;
   b. from 1 to about 5 weight percent boric acid;
   c. from 0.3 to 1 weight percent sodium tetraborate decahydrate;
   d. from 1 to about 5 weight percent hydrogen peroxide;
   e. up to 2 weight parts of a surfactant per 100 weight parts of said solution;
   f. up to 2 weight parts of an alkyl phthalate ester per 100 weight parts of said solution; and
   g. water in an amount from about 77 to about 94 weight percent, sufficient to complete said solution.

2. The fire retardant solution of claim 1 wherein the surfactant is in an amount from about 0.5 to 2 weight parts per 100 weight parts of said solution.

3. The fire retardant solution of claim 1 wherein said ammonium sulfate is present in said solution at a concentration from 4 to about 7 weight percent.

4. The fire retardant solution of claim 1 wherein said boric acid is present in said solution at a concentration from 1.5 to about 4 weight percent.

5. The fire retardant solution of claim 1 wherein said sodium tetraborate decahydrate is present in said solution at a concentration from 0.5 to about 0.8 weight percent.

6. The fire retardant solution of claim 1 wherein said hydrogen peroxide is present in said solution at a concentration from 2 to about 4 weight percent.

7. The fire retardant solution of claim 1 wherein the alkyl phthalate ester is in an amount from 0.3 to 2 weight parts per 100 weight parts of said solution.

8. The fire retardant solution of claim 7 wherein said alkyl phthalate ester is dibutyl phthalate.

9. The method for imparting fire retardancy to cellulosic substances which comprises coating the surface of said substances with the solution of claim 1 at a dosage from 0.25 to 1 gallon per 100 square feet of said surface.

10. The method of claim 9 wherein said coating is applied at a dosage of 0.4 to 0.6 gallon per 100 square feet of said surface.

11. The method of claim 9 wherein said cellulose substance is wood.

12. The method of claim 9 wherein said cellulose substance is cotton.

13. The method for imparting fire retardancy to fabrics which comprises coating the surface of said fabrics with the solution of claim 1 at a dosage from 0.25 to 1 gallon per 100 square feet of said surface.

14. The method of claim 13 wherein said solution is applied at a dosage of 0.4 to 0.6 gallon per 100 square feet of said surface.

15. The method of claim 13 wherein said fabric is polyester.

16. The method of claim 13 wherein said fabric is a blend of polyester and cotton.

17. The method for preparing a fire retardant solution which consists essentially of:
   a. heating water to a temperature from 100° to about 150° F. and admixing with said water the following dry ingredients for each 33 weight parts of water:
      (1) from 3 to about 10 weight parts ammonium sulfate;
      (2) from 1 to about 5 weight parts boric acid;
      (3) from 0.3 to about 1 weight parts sodium tetraborate decahydrate;
   b. agitating said mixture until said dry ingredients have dissolved;
   c. adding the following liquid ingredients for each 33 weight parts of water;
      (1) 1 to about 5 weight percent hydrogen peroxide;
      (2) 67 weight parts water;
   d. adding up to 2 weight parts of a surfactant per 100 weight parts of said solution; and
   e. adding up to 2 weight parts of an alkyl phthalate ester per 100 weight parts of said solution.

18. The method of claim 17 wherein the surfactant is added in an amount from about 0.5 to 2 weight parts per 100 weight parts of said solution.

19. The method of claim 17 wherein the alkyl phthalate ester is added in an amount from 0.3 to 2 weight parts per 100 weight parts of said solution.

20. The method of claim 19 wherein said alkyl phthalate ester is dibutyl phthalate.

* * * * *